United States Patent [19]

Gayler

[11] Patent Number: 5,136,230
[45] Date of Patent: Aug. 4, 1992

[54] BATTERY POWER CUT-OFF CIRCUIT

[76] Inventor: Andrew J. Gayler, 44a Marlborough Street, Brighton, South Australia, Australia, 5048

[21] Appl. No.: 683,975

[22] Filed: Apr. 11, 1991

[30] Foreign Application Priority Data

Apr. 12, 1990 [AU] Australia ............... PJ9622

[51] Int. Cl.⁵ .................................. H02J 7/00
[52] U.S. Cl. ......................... 320/13; 361/92
[58] Field of Search .................. 320/13, 28, 32; 307/10.7; 322/8, 99; 361/79, 83, 92

[56] References Cited

U.S. PATENT DOCUMENTS

| 3,721,887 | 3/1973 | Nickerson | 320/13 |
| 4,088,940 | 5/1978 | Ciarniello et al. | 307/10.7 |
| 4,137,557 | 1/1979 | Ciarniello et al. | 361/92 |
| 4,218,717 | 8/1980 | Shuster | 320/32 X |
| 4,237,385 | 12/1980 | Jurgens et al. | 320/13 X |
| 4,493,001 | 1/1985 | Sheldrake | 361/92 |
| 4,902,956 | 2/1990 | Sloan | 320/13 |

FOREIGN PATENT DOCUMENTS 8912343 12/1989 PCT Int'l Appl. .
9001435  2/1990 PCT Int'l Appl. .
9006614  2/1990 PCT Int'l Appl. .

Primary Examiner—Steven L. Stephan
Assistant Examiner—Kristine Peckman
Attorney, Agent, or Firm—Edward W. Callan

[57] ABSTRACT

A power cut-off circuit comprises a voltage monitoring circuit and an over-ride circuit (25), the voltage monitoring circuit comparing a portion of the battery voltage with a fixed reference voltage by way of a comparator (26) which, upon change of state, de-enegizes a relay coil of a relay (14) and thereby disconnects the power to most of the vehicle, but not to the starter motor circuit (11), and the override circuit (25) monitors override inputs in response to override conditions, and re-energizes the relay coil in response to an override input, in turn restoring the previously disconnected power.

7 Claims, 2 Drawing Sheets

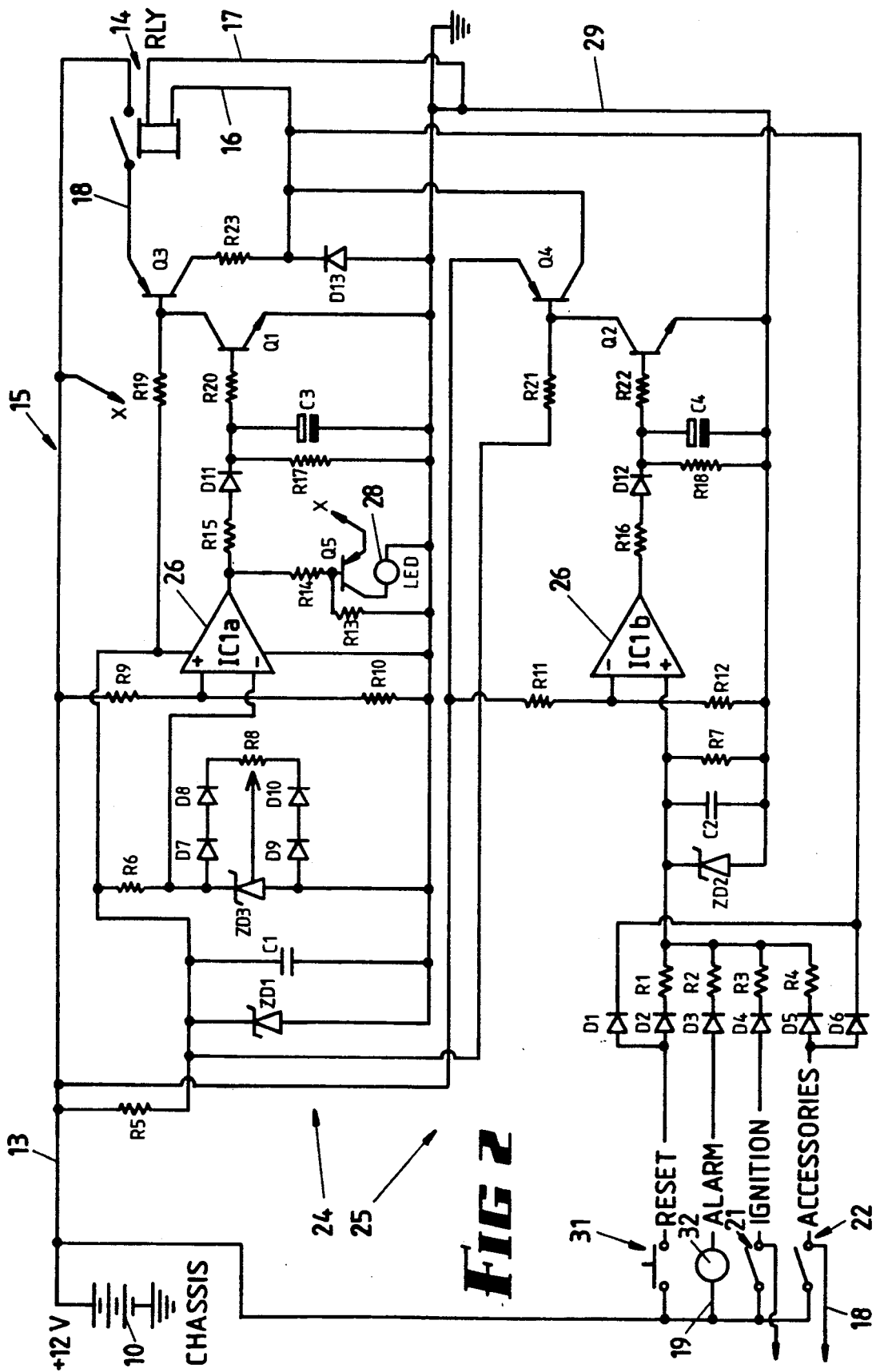

BATTERY POWER CUT-OFF CIRCUIT

FIELD OF THE INVENTION

This invention relates to a circuit for protecting the charge of a battery, and more particularly to a low battery voltage cut-off, circuit designed to prevent the charge of a battery from falling below a preset charging level for use in a motor vehicle wherein the power of a DC battery is required for starting an engine.

BACKGROUND OF THE INVENTION

A problem which is commonly encountered in automobiles is that, for reasons which may be inadvertent, a battery loses power due to drainage of current from it, and the main object of this invention is to provide a cut-off circuit which will be effective in prevention of the battery drainage.

This problem has been recognized and various attempts have been made to provide a satisfactory voltage monitoring circuit, and in some of those attempts a low voltage cut-out circuit has also been provided.

In the German patent DE 3742312 in the name of Wemhoner, there is described a circuit wherein a comparator compared a voltage reference taken from a battery with a fixed voltage source, and when the comparator changed state upon the battery voltage diminishing, a relay was actuated to remove inessential loads from essential loads. The division of inessential and essential loads within a vehicle wiring system is also used in other prior art, but involves considerable wiring and is inconvenient for after-market installation.

In the Australian PCT application AU89/00249, and the U.S. Pat. Nos. 4,137,557 and 4,088,940, the division between essential and inessential loads was also made in the wiring. The relay coil was driven by an amplifier. However, there was no time delay mechanism, and no override. Furthermore, it was possible that the system itself could be responsible for drainage of energy from a battery. None of the aforesaid patent specifications taught the use of any current limiting device, although the German patent specification 3742312 utilised latching relays. These are not looked upon with favor by the applicant because of cost and power rating.

The General Motors Corporation Patent U.S. Pat. No. 4,493,001 was essentially an original equipment device because of the large number of connections required in the motor vehicle. It did not however utilise ignition sensing bypass circuits. However, it had a manual override switch which was incorporated in the ignition switch system of the vehicle, and also an anti-theft switch.

Finally, in the U.S. Pat. No. 4,218,717 in the name of Shuster, a system was disclosed which utilised a current threshold relay. The system monitored the current for excessive drain for excessive period of time, and it triggered upon excessive current flow. It was not sensitive to small current drain as for example maybe caused by the parking lights of the vehicle, but it did have a time delay circuit. The circuit was bypassed by the ignition switch.

BRIEF SUMMARY OF THE INVENTION

The object of this invention is to provide a battery power cut-off circuit which is effective in cutting off the possible source of current drainage from a vehicle battery, and yet which is simple to install with only a few connections required to be made. In one embodiment this invention comprises a voltage monitoring circuit and an override circuit, the voltage monitoring circuit comparing a portion of the battery voltage with a fixed reference voltage by way of a comparator which, upon change of state, de-energises a relay coil of a relay and thereby disconnects the power to most of the vehicle, but not to the starter motor circuit, and the override circuit monitors override inputs in response to override conditions, and re-energises the relay coil in response to an override input, in turn restoring the previously disconnected power.

More specifically, the power cut-off circuit of the present invention comprises of a voltage monitoring circuit, an over-ride circuit, and a relay having a coil and switch means connectable in a voltage rail of the battery so as to be operable to isolate some of the electrical apparatus of the vehicle, the voltage monitoring circuit comprising a comparator which compares a portion of battery voltage with a fixed reference voltage, first circuit means coupling the output of the comparator with the relay coil to de-energise the relay coil upon change of state of the comparator due to diminution of the battery voltage and thereby operate the relay switch to produce said electrical apparatus isolation, the over-ride circuit monitoring a plurality of over-ride inputs which are in response to respective over-ride conditions, and comprising second circuit means coupling the over-ride inputs to the relay coil to effect re-energisation thereof upon any one of said over-ride inputs being energized.

It is only necessary for the override circuit to "look" at the conditions requiring override (for example the motor running and power being present at the ignition coil), but the power for actuating the override circuit can be, and in most instances is, derived directly from the battery by a manual reset without necessarily interfering with operation of the vehicle. The following conditions must be satisfied to provide a system which is unlikely to cause inconvenience:

(1) Continued Operation

If the unit is wired to disconnect loads from the battery, it is important that the device does not isolate the battery from the vehicle's electrical system while the engine is running. This could happen if the vehicle's alternator were to burn out. If the alternator burnt out and the vehicle had load drain from the battery (for example headlights, wipers, demisters etc) the unit should not respond to a low voltage due to battery conditions as the unit would then stop the engine. None of the prior art referred to above appears to have taken this possibility into account.

(2) Burglar Alarm

If the unit is connected with a burglar alarm, it is required that the burglar alarm should not take its power from the unit but directly from the battery. As many burglar alarms use a vehicle's headlights, horn or hazard lights, they would not normally be activated if the unit had tripped by sensing low battery voltage. In this invention, but utilising a twin comparator arrangement, as soon as the alarm is energised, the input voltage to the alarm can be used to override the unit and provide power to the vehicle for the alarm to operate.

(3) Manual Reset

A requirement for manual reset switch has been recognised by some in the prior art, and it can be located alternatively on the device itself or can be remotely located for example on the dash of a vehicle. Although the invention is primarily directed to embody an override system, that override system need not necessarily be related to alarm, ignition or manual overrides. For example, a high power consumption accessory such as a refrigerator could be turned off, only to be reactivated upon actuation of a higher temperature thermostat switch or some other switch means which may be manual.

DETAILED DESCRIPTION OF THE PREFERRED EMBODIMENT

Figure 1:
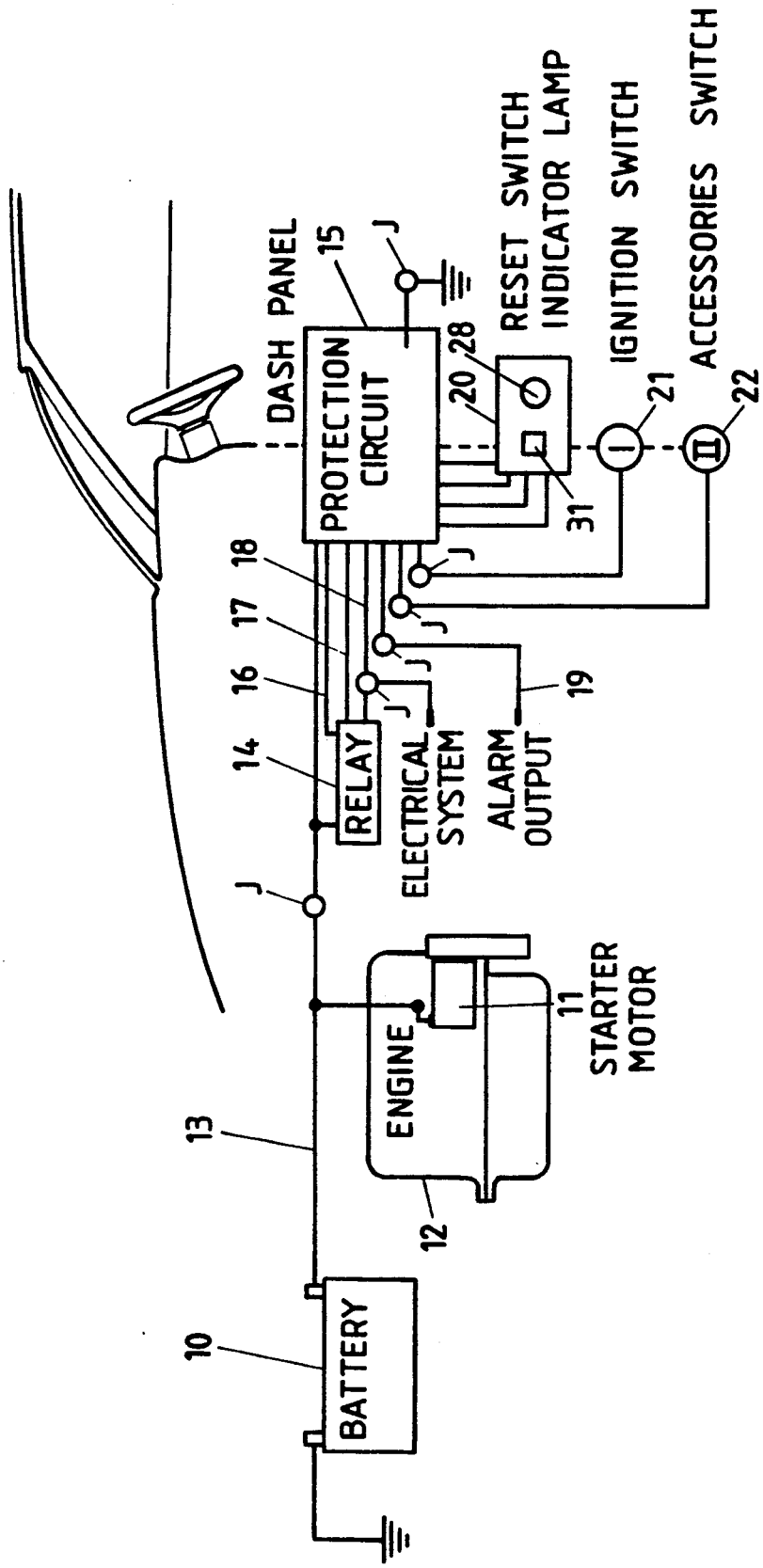

An embodiment of the invention is described below in detail with reference to and is illustrated in the accompanying drawings in which:

FIG. 1 is a diagrammatic representation of an automobile having the battery power cut-off circuit installed; and FIG. 2 is a circuit diagram of the circuit.

Referring first to FIG. 1, an automobile is provided with a battery 10 which is connected to the starter motor 11 of an engine 12, without any interference of the wiring by the circuit of this invention. The positive rail 13 extends to a relay 14 of a protection circuit 15 as illustrated in FIG. 2, and the relay is connected through conductors 16, 17 and 18 to the protection circuit 15, the conductor 18 being in direct communication with the accessories of the motor vehicle, and a conductor 19 is coupled to an alarm output if such exists on the vehicle.

Within the cabin of the vehicle, desirably at the location of the dash panel, there is located the protection circuit 15, also a reset switch 31 and indicator lamp 28 in a small console 20, an ignition switch 21 and an accessory switch 22. The interconnection of those elements with the circuit 15 is shown in some detail in FIG. 2.

Reference is now made to FIG. 2, wherein there are two comparator circuits 24 and 25, the comparator circuit 24 being a voltage comparator and the comparator circuit 25 being an override circuit to override the battery cut-off circuit when it is required to restart the engine for example. Each circuit contains a respective portion of a dual comparator 26, the portions respectively being marked IC1a and IC1b.

Reference is first made to the voltage comparator circuit 24. The voltage of battery 10 is divided by the resistors R9 and R10, and compared to a temperature compensated voltage reference with comprises a Zener diode ZD3, and the diodes D7, D8, D9 and D10 in circuit with the variable resistor R8. The cut-off point is preset by adjustment of the resistor R8.

The comparator IC1a is supplied with power via R5 and ZD1, with capacitor C1 being across the Zener diode ZD1, and the Zener diode ZD1 and capacitor C1 functioning to remove any voltage transients.

While the battery voltage on rail 13 is high, the output of IC1a of comparator 26 is high. This keeps the capacitor C3 charged and turns on the (NPN) transistor Q1 via resistor R20. Q1 in turn turns on the (PNP) transistor Q3 which energises the relay 14, but this is retained on via the current limiting resistor R23, which has the effect of using much less power than what is required to close the relay 14, so that battery drain is minimised. This in turn makes it feasible for relay 14 to be sufficiently large to isolate most of the electrical apparatus of the vehicle.

If the voltage on the battery rail 13 falls below the predetermined level, the output of comparator IC1a goes low. Transistor Q5 then goes low through the resistors R13 and R14, and the transistor Q5 conducts turning on a warning indicator, the light emitting diode 28 which is in the reset switch and indicator lamp console 20. The negative lead of the LED28 couples through to conductor 29 (this not being shown for simplicity of reading the circuit diagram). At this stage, no current is supplied to the transistor Q1, and the voltage across the resistor R20 decreases as the capacitor C3 is discharged by transistor Q1 and resistor R17. After the time delay during which capacitor C3 discharges, transistor Q3 turns off and is again returned to a high voltage bias through resistor R19. This disconnects the current to the relay 14 (and its protective diode D13) disconnecting the electrical load from the battery 10. However, until this occurs, the relay 14 remains energised through the resistor R23, which has the effect of greatly limiting the current drawn from the battery 10. This is an important aspect of this invention.

Reference is now made to the second comparator circuit which can be regarded as an override circuit.

It is important that the battery should not be out of circuit if the ignition switch is turned on, which in turn provides energy for the accessories of the vehicle, or if the reset button has been pushed, or thirdly if an alarm system has been activated.

If any of these inputs go high, the relay is turned hard on. The reset button 31, the alarm circuit 32 (if used on the vehicle) or the ignition switch 21 or the accessories switch 22 (incorporated in the ignition switch 21) will respectively include the diodes D1 and D2; D3, D4, D5 and D6, which provide low resistance current flow paths and inhibit interference between the inputs. The voltage is "clamped" by the Zener diode ZD2 and capacitor C2 to remove any voltage transients, and biased to ground by resistor R7. If that voltage is high, the output of the portion IC1b of the comparator 26 is high (greater than the voltage set by the voltage divider R7, R12) and the (NPN) transistor Q2 is turned on by the resistor R16, diode D12 and resistor R22, and in turn turns on the (PNP) transistor Q4 which applies full voltage to the relay 14. When the inputs are all low, the portion IC1b of comparator 26 will go low and after a time delay due to interaction of capacitor C4 and resistor R18, the transistors Q2 and Q4 are turned off and the supply to the relay 14 is also turned off. (A simple transistor circuit may be used in lieu of comparator IC1b.)

One of the aspects of this invention is that the circuit is a "fail safe" circuit, and if the circuit fails, the diodes D1 and D6 (reset button 31 and accessories switch 22 of the ignition switch 21) apply current directly to the relay coil of relay 14. Provided the relay has not failed, the vehicle can be started by turning the key to the accessories position and pushing the reset button and this will bring full power back to the vehicle.

In the circuit, the R-C time delay of resistor R17 and capacitor C3 in the comparator circuit portion 24 is set so that sudden changes in battery voltage do not trigger the circuit to turn off. This also prevents entry to the vehicle (for example due to interior lights being illuminated) from triggering the circuit. The indicator LED28 will become illuminated whenever the voltage is low.

The R-C time delay associated with resistor R18 and capacitor C4 is set so that once an override condition has occurred, the battery voltage has time to settle before being monitored. For example, if the vehicle has been idling with many loads on and the battery voltage is low (indicated by illumination of LED 28) and is then turned off with loads disconnected and the engine stopped, the battery voltage can slowly rise. There is therefore a need to have a delay in time.

Since the alarm circuit 32 is connected through the diode D3 and resistor R2 to IC1b of comparator 26, the comparator IC1b will maintain the relay 27 energised for the alarm to sound and other accessories connected thereto (for example hazard lights or horn) will operate without the circuit disconnecting the battery. If the circuit has tripped and power is off and the alarm is energised, the circuit will override and reconnect the battery with the electrical system.

The following further advantages will be seen to exist in this invention which are seldom, if ever, found in prior art:

(a) Four basic wire connections marked "J" are all that are required for installation, apart from the connections to the battery and to earth (ground), and optionally to an alarm (if used).

(b) The inputs of reset 31, alarm 32, ignition 33 and accessories 34 are only "looked at" by the circuit, power being delivered directly from the battery through the comparator 26, and the resistor R23 limits the current which flows through the circuit during the periods of time that it is necessary for relay 27 to remain closed.

We claim:

1. A power cut-off circuit for a vehicle having electrical apparatus and a storage battery, said power cut-off circuit comprising a voltage monitoring circuit, an over-ride circuit, and a relay circuit having a coil and switch means connectable in a voltage rail of the battery so as to be operable to isolate some of the electrical apparatus of the vehicle, the voltage monitoring circuit comprising a comparator which compares a portion of battery voltage with a fixed reference voltage, first circuit means coupling the output of the comparator with the relay coil to de-energize the relay coil upon change of state of the comparator due to diminution of the battery voltage and thereby operate the relay switch to produce said electrical apparatus isolation, the over-ride circuit monitoring a plurality of over-ride inputs which are in response to respective over-ride conditions, and comprising second circuit means coupling the over-ride inputs to the relay coil to re-energize the relay coil in response to any one of said over-ride inputs being energized.

2. A power cut-off circuit according to claim 1 further comprising a current limiting resistor in the relay circuit which limits current flow through the relay coil when the battery voltage is high.

3. A power cut-off circuit according to claim 2 wherein the second circuit means re-energizes the relay coil without passing current through said current limiting resistor.

4. A power cut-off circuit according to claim 1 wherein said over-ride circuit comprises both an accessory switch and a reset switch each of which, upon closure, energizes one of said over-ride inputs by completing a low resistance circuit between said battery and said relay coil.

5. A power cut-off circuit according to claim 1 wherein said over-ride circuit further comprises a further comparator coupled to all of said over-ride inputs, said further comparator changing state in response to any one of said over-ride inputs being energized to cause said re-energization of the relay coil.

6. A power cut-off circuit according to claim 5 comprising transistors respectively coupled between said relay coil and said comparators and controlled by the respective comparators to change operation in response to a change of state by the respective comparator and further comprising resistor/capacitor time delay circuits which respectively maintain said change of state of the respective comparator to the respective transistor for a period of time after said change of state of the respective comparator.

7. A power cut-off circuit according to claim 4 wherein said over-ride circuit comprises at least one diode between each of said over-ride inputs and the relay coil, and wherein said accessory switch and said reset switch are respectively coupled to the relay coil through two separate parallel circuits each of which contains a separate diode.

* * * * *